United States Patent [19]

Graf et al.

[11] Patent Number: 5,045,332

[45] Date of Patent: Sep. 3, 1991

[54] METHODS AND MATERIALS FOR INHIBITING THE DEVELOPMENT OF WARMED-OVER FLAVOR IN MEAT

[75] Inventors: Ernst Graf, New Brighton, Minn.; S. Scott Panter, San Francisco, Calif.

[73] Assignee: The Pillsbury Company, Minneapolis, Minn.

[21] Appl. No.: 417,528

[22] Filed: Oct. 10, 1989

[51] Int. Cl.$^5$ .......................... A23B 4/02; A23L 1/314
[52] U.S. Cl. .................................... 426/332; 426/641; 426/650; 426/652
[58] Field of Search ............... 426/641, 646, 652, 643, 426/644, 332, 650

[56] References Cited

U.S. PATENT DOCUMENTS

| | | | |
|---|---|---|---|
| 2,491,646 | 12/1949 | Coleman et al. | 426/265 |
| 3,395,024 | 7/1968 | Earle | 426/291 |
| 3,552,978 | 1/1971 | Inklaar et al. | 426/332 X |
| 3,810,998 | 5/1974 | Sato et al. | 426/332 |
| 3,821,444 | 6/1974 | Sato et al. | 426/332 |
| 3,852,486 | 12/1974 | Walker et al. | 426/332 |
| 3,939,288 | 2/1976 | Sato et al. | 426/332 |
| 3,962,472 | 6/1976 | Torres | 426/281 |
| 3,985,904 | 11/1976 | Bernotavicz | 426/332 |

OTHER PUBLICATIONS

The Merck Index, Eleventh Ed., Abstract 232, pp. 41–42, published by Merck & Co., Inc., Rahway, N.J.
"Crab Shell Derivative Prevents Flavor Loss," C&EN, Sep. 25, 1989, p. 53.
"WOF Busters Attack Warmed-Over Flavor," Beach Observer, Dec. 14, (1988) Seattle.
Cross, et al., "Scope of Warmed-Over Flavor and Its Importance To The Meat Industry," *Warmed Over Flavor of Meat*, 1–8 (1987) Academic Press, Inc., Harcourt Brace Javanovich Publishers, Boston.
Wanstedt, et al., "Sensory Attributes of Precooked, Calcium Alginate-Coated Pork Patties," *Journal of Food Protection*, 44(10):732–735 (1981).

*Primary Examiner*—Arthur L. Corbin
*Attorney, Agent, or Firm*—Arnold, White & Durkee

[57] ABSTRACT

Use of compounds which are capable of providing selecter cations in solution to inhibit the development of warmed-over flavor (WOF) in meats and meat products. $Al^{3+}$ and divalent cations, such as $Ca^{2+}$, $Cu^{2+}$, $Zn^{2+}$, and $Mg^{2+}$, may inhibit iron-catalyzed oxidation of certain phospholipids in the meat and thereby reduce WOF generation.

41 Claims, 3 Drawing Sheets

METHODS AND MATERIALS FOR INHIBITING THE DEVELOPMENT OF WARMED-OVER FLAVOR IN MEAT

BACKGROUND OF THE INVENTION

1. Field of the Invention

This invention relates to inhibition of warmed-over flavor in meat. More particularly, it relates to methods and compounds for inhibiting warmed-over flavor using selected cations.

2. Description of Related Art

It has been long known that meat (e.g. beef, poultry, pork, fish) which is cooked and then stored at refrigerated temperatures may develop a rancid or stale flavor. Development of such flavors may occur in a relatively short period of time, generally much shorter than the time required for spoiling of raw meat. This phenomenon has come to be known in the industry as "warmed-over flavor" (abbreviated "WOF").

There are many contexts in which cooked meat is refrigerated and then reheated for consumption, for example, leftovers, school luncheons, microwavable dinners, airline foods, fast foods, delicatessen foods, parbaked and even frozen pizzas, and the like. Development of WOF can adversely affect the palatability of meat in all of these situations and thus poses a significant problem.

Various treatments have been proposed to address this problem. For example, the meat may be cured with agents such as nitrites or nitrates. For reasons which heretofore have not been entirely understood, cured meat does not generally develop WOF. However, curing tends to impart a salty, smoked flavor and is thus unacceptable in many contexts. Also, nitrites are thought to be fairly carcinogenic as they may be converted to nitrosamines at the gastric pH, thereby effectuating damage to DNA.

Another treatment which has been proposed is mixing chitin or carboxymethyl chitosan into ground meat. However, this treatment appears to be limited to use with ground meat, presumably due to the large molecular size of these biopolymers, hindering their ability to diffuse very far into meat.

Another treatment involves application of a compound capable of scavenging oxygen radicals. Examples of such compounds are BHA, BHT, TBHQ, propyl gallate, alphatocopherol, and rosemary extract. However, scavengers have been shown to exert only minor effects on WOF development, presumably since oxygen radicals are not completely responsible for the chemical breakdown leading to WOF.

Application of sodium tripolyphosphates ("STPP") has also been suggested, but sometimes imparts a soapy texture on the meat. Furthermore, STPP contains a significant amount of sodium and thus may not be commercially acceptable.

Use of polyvalent cation chelators such as EDTA have been proposed but are not always effective.

Viscous marinades (e.g. gravies) are sometimes used in an attempt to retard oxygen diffusion into the meat, but are generally ineffective for that purpose.

Other approaches, similar to marinades, have been employed as well, including the use of film-forming or coating agents to retard oxygen diffusion into meats. Substances composed of cross-linking agents in combination with food polymers such as alginate, pectin, HPMC (hydroxypropyl methyl cellulose), methylcellulose and even carboxymethyl cellulose have been proposed for use as enrobing agents to prevent oxygen uptake by the coated meat product. For example, when calcium is combined with alginate, a "gelling" reaction occurs between the two agents, leading to the development of a crusty coating or film that can be applied to the exterior of food which may or may not aid in retarding oxygen uptake (see, e.g. Wanstedt et al., 1981; and U.S. Pat. No. 3,395,024).

Enrobing or film-forming agents have not found widespread use in the food industry in WOF preventatives in that they are generally ineffective for this purpose and even found to impart an undesirable texture.

Accordingly, there is a continuing need to develop materials and methods for treating meat to inhibit the development of WOF. It is therefore an object of this invention to provide treatments which address at least some of the disadvantages experienced in the art.

SUMMARY OF THE INVENTION

In a general aspect, the present invention provides an improved method for inhibiting the development of WOF in meat, comprising adding to the meat an effective amount of a compound capable of providing a "WOF-retarding cation" in solution. For the purposes of the present invention, the term "WOF-retarding cation" is intended to refer to any divalent cation or $Al^{3+}$. The preferred divalent cations for use in this invention include $Ca^{2+}$, $Cu^{2+}$, $Zn^{2+}$, and $Mg^{2+}$. As used herein, the term "WOF-retarding cation-providing compound" is intended to refer to any compound or composition that will effectively provide the divalent or $Al^{3+}$ cation in a form such that it may be taken up by the meat product being treated rather than simply coating the outside of the meat product.

Many compounds exist which are capable of providing these cations in solution, e.g., salts of calcium, zinc, magnesium, aluminum, and copper. In the case of $Ca^{2+}$, compounds that are Generally Recognized as Safe (GRAS) by the FDA, such as calcium chloride, calcium sulfate, calcium acetate, or calcium gluconate will, of course, be particularly preferred. However, other divalent or even trivalent cation providing compounds are GRAS, and may be employed with benefits in accordance herewith, including copper gluconate, aluminum sulfate, zinc chloride, sodium aluminum phosphate, and the like.

The term "meat" is used broadly herein to include flesh from numerous types of animals, such as mammals, fowl, fish, and also includes artificial or synthetic meats. In particular, the term includes such meats as beef, pork, mutton, chicken, turkey, seafood, and freshwater fish, sausages, meat patties, and the like.

The amount of WOF-retarding cation-providing compound which will be effective to retard WOF and the manner in which the compound is applied may depend upon numerous factors, e.g. the cation involved, the type of meat, the size or cut of the meat, whether or not the meat is ground, the cooking conditions, the storage time and temperature, etc.

Although the use of WOF-retarding cations to retard WOF development in accordance with this invention may have a more dramatic effect in the case of uncured meat, the invention can also be used in association with cured meat. As will become apparent in connection with the proposed mechanism discussed below, it is believed that the cations of this invention may work cooperatively with nitrites and other curing agents since they appear to attack WOF development in differing, non-competitive ways.

The present invention may be used in connection with meat regardless of its cut or physical characteristics. For example, the meat could be ground, sliced, filleted, pattied, diced, minced, tenderized, uncut, etc.

The WOF-retarding cation-providing compound may be added to the meat in numerous ways. For example, a solution of the compound could be sprayed or coated onto the surface of the meat. The meat could be soaked in a solution of the compound, allowing the meat to imbibe or absorb the solution. Solid particles of the compound could be sprinkled on or intermixed with the meat. The compound could be added in numerous other ways, e.g. basting, pasting, brushing, injecting, or vapor coating. The scope of this invention is intended to include these and all other means for adding the cation-providing compound to meat.

If the meat is ground such as patties or sausages, a solution (aqueous) of the compound is preferably intermixed with the ground meat. Alternatively, solid particles comprising the compound are preferably intermixed therewith.

The method of application and physical characteristics of the meat may affect the concentration gradient of the cation in the meat. For example, in the case of ground meat where the compound is intermixed therewith, the concentration is likely to be relatively uniform throughout the meat.

However, in the case of uncut meat or cut meat which has not been ground, where the compound is applied to the surface thereof, there will likely be a concentration gradient within the meat, with decreasing concentration towards the center of the meat. That is, the compound is likely to be concentrated at or near the surface of the meat. Since oxidation of phospholipids by oxygen in air is believed to be the cause of WOF development (as described in more detail below), this gradient may provide the advantage of concentrating the cations where they are most needed, i.e. near the surface where oxygen is present. Since $Ca^{2+}$ and other cations are believed to have the ability to diffuse into meat at least as far as oxygen, surface treatment of the meat should in general be effective to inhibit oxidation of phospholipids in the meat.

Gelling or enrobing compounds or compositions that act to bind up, agglomerate or chelate divalent cations will not be preferred for use in connection with the invention in that they will tend to prevent the uptake of the cation by the meat product, thereby impairing the beneficial attributes of the invention. For example, materials such as alginate, when combined with calcium, form a thick, crusty coating or rigid film. These films tightly immobilize the calcium cation, thereby preventing its uptake into the coated meat product. Therefore, one will desire to avoid the use of cation-binding agents such as alginate, carboxymethyl cellulose, etc., or even soluble chelating agents such as EDTA.

In a preferred embodiment, the amount of cation-providing compound added is between about 25 and 5000 parts by weight of the cation per million parts by weight of the meat. More preferably, the range is between about 100 and 2500 parts per million, and even more preferably between about 200 and 1000 parts per million. It has been found that amounts in these ranges may significantly decrease the development of WOF in most types of meats.

In another preferred embodiment, a sufficient amount of the WOF-retarding cation-providing compound is added such that the average concentration of said compound at the surface of the meat is between about 250 and 25,000 ppm. The amount needed to obtain this result may depend on a variety of factors, such as the texture of the meat and the method of application.

In various embodiments, the cation-providing compound is added through application of a solution of the compound. The concentration of the solution may vary depending upon the amount of the solution one wishes to add, the desired concentration in the meat, etc. Preferably, the solution has a concentration of the cation-providing compound of between about 0.1% and 10% by weight. More preferably, the concentration is between about 0.2% and 5%, most preferably between about 0.4 and 2%. More concentrated solutions may be used, but one may experience difficulty in uniformly dispersing the cations. More dilute solutions may also be used, but in order to achieve the desired concentration, one might have to use so much solution that the meat will not be able to take up a suitable amount of the selected cation. Thus, these are not preferred.

In a preferred embodiment, the method further comprises the steps of cooking the meat, cooling the cooked meat to a temperature below about 10° C. (i.e. refrigerating or even freezing the meat), and storing the cooled meat for at least about 20 minutes or so at a temperature below about 10° C. In untreated meat, WOF would typically develop rapidly under refrigerated conditions. However, with treatments in accordance with this invention, WOF development may be significantly inhibited.

The term "cooking" is used broadly to include any method of heating the meat, such as with a conventional oven, microwave oven, stovetop, charcoal grills and the like. It is intended to include all types of cooking, such as baking, frying, roasting, broiling, boiling, grilling, smoking, etc. It also includes all degrees of cooking meat (e.g. rare to well done).

When the cooked meat is to be sold commercially, the meat should be cooked sufficiently to bring its internal temperature to a level sufficient to meet or exceed U.S.D.A. regulations. For example, in the case of poultry, the meat should be cooked so that the internal temperature is at least 71° C.; beef at least 63° C.; and pork at least 58° C.

For convenience, the WOF-retarding cation-containing compound is preferably added prior to the cooking step. However, it could also be added during cooking, or both before and during cooking. Some beneficial effect may be obtained by adding the compound only immediately after cooking, but this procedure is not preferred.

Another aspect of the present invention provides meat which has been prepared in accordance with any of the above described methods.

Another aspect of this invention provides a seasoning or seasoning mix for adding to meat which is to be cooked and stored under refrigeration, comprising a WOF-retarding cation-providing compound which is effective to inhibit the development of WOF in the meat. The term "WOF-retarding cation-providing compound" is used consistently with the above discussion, i.e. a compound which is capable of providing cations in solution (e.g. water, or moisture in or from meat). The preferred compounds and cations are as described above.

Finally, another broad aspect provides a method for inhibiting the development of WOF in meat, comprising adding to the meat an amount of a cation-providing compound which is effective to inhibit iron-catalyzed oxidation of phospholipids in the meat. More generally, a method is provided for inhibiting iron-catalyzed oxidation of phospholipids in any material composed of a heme-containing protein (e.g. myoglobin), comprising adding to the material an effective amount of a cation-providing compound. The preferred materials, concentrations, and methods of application discussed above apply to these aspects as well.

DETAILED DESCRIPTION OF PREFERRED EMBODIMENTS

Theoretical mechanisms involved in the development and inhibition of WOF will now be discussed. However, it should be appreciated that any theory presented herein is intended for illustrative and/or theoretical purposes only, and the disclosure and claims should not be construed as being limited thereto.

Up until now the chemical mechanism responsible for development of WOF has not been entirely understood. It is generally believed that WOF is caused by lipid oxidation, but is not clear in the literature why WOF development is so prevalent in uncured cooked meat, but not in raw or cured meat.

In connection with the present invention, it is theorized that heme-derived iron may bind to certain phospholipids found in meat and catalyze their oxidation leading to WOF development, and that such catalyzed oxidation can be inhibited by competitive displacement of the iron cation by the cations of the invention.

It is known that biological membranes comprise triglycerides and various phospholipids in meat, e.g., phosphatidylethanolamine (PE), phosphatidylserine (PS), and phosphatidylcholine (PC) (structures shown below):

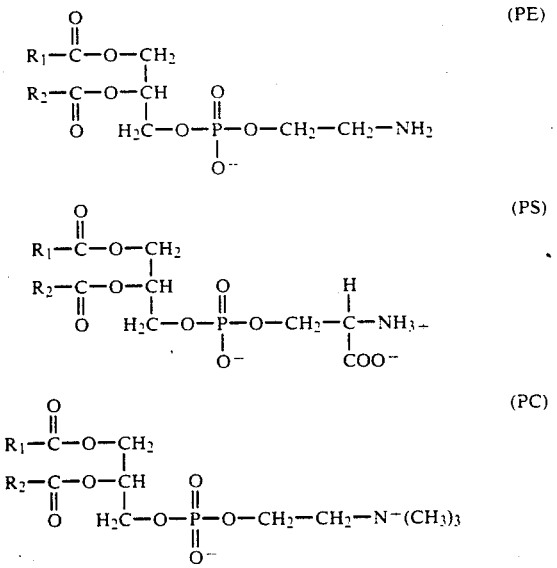

It is also known that heme-containing proteins in meat (such as myoglobin) release iron when the meat is cooked.

In connection with this invention, it is proposed that iron tends to bind or complex with the polar head group moiety of certain phospholipids (e.g., PS or PE) and catalyze the oxidation of the iron-lipid complex (i.e. oxidation of the double bonds of the fatty acyl side chains $R_1$ and $R_2$ of phospholipids). PS, which has a net negative charge, and PE, which has a displaceable proton, the loss of which will result in a net negative charge, are good candidates for complexing with iron, while positively charged PC is not. Thus, PS and PE would appear to provide excellent substrates for lipid peroxidation catalyzed by iron bound to phospholipids.

In view of this understanding of iron-catalyzed autoxidation of phospholipids leading to WOF development, it is proposed that the problem can be combatted by competitive displacement of the iron cation with a selected cation. Surprisingly, the phospholipids complexed with the WOF-retarding cation appear to be much less susceptible to autoxidation leading to WOF development.

It should be noted that this hypothesis is consistent with the observation that nitrites and other curing agents tend to eliminate development of WOF, since such agents may block the release of iron from heme-containing proteins in meat. However, since some iron may still be released in cured meat, the divalent cations of this invention could be used cooperatively with curing agents to combat iron-catalyzed oxidation of phospholipids.

Also, the mechanism is consistent with the notion that radical scavengers exert only minor inhibitory effects on WOF development, since the proposed mechanism does not assume that iron catalyzes the formation of activated oxygen species which attack the phospholipids, but rather it assumes that iron facilitates in situ autoxidation.

Furthermore, it is consistent with reports that in delipidated, reconstituted meat model systems, only the addition of PE, but not of PC of similar fatty acid composition, catalyzed WOF generation. A separate study showed that during cooking of ground beef patties the arachidonic acid content in PE decreased from 39 to 28 mole %, whereas arachidonic acid in PC remained unchanged. These authors looked at arachidonic acid because of its extremely high susceptibility to iron-mediated peroxidation. It is proposed that this high susceptibility of arachidonic acid in PE, but not in PC, to oxidative degradation is a direct result of the oxidation of the iron-PE complex.

Finally, the theory is consistent with the observation that $Na^+$ increases the rate of WOF formation, presumably since monovalent cations are generally unable to bind to the negatively charged phosphate moiety of PE.

As noted above, certain trivalent cations would presumably also have the ability to competitively displace iron in this scheme and thus retard WOF development. However, many trivalent cations are, in general, toxic and thus not practical for use in connection with foods intended for human consumption.

A preferred embodiment of this invention provides a dry seasoning mix containing calcium chloride or other WOF-retarding cation salt as a major constituent. The seasoning might include various other spices and flavorings. For example, such a seasoning might comprise (in the following preferred order of relative concentration): calcium chloride, sodium chloride, dextrose, paprika, tumeric, monosodium glutamate, onion powder, corn starch, garlic powder, tricalcium phosphate, meat flavors, and lecithin.

Another preferred embodiment provides a marinade containing calcium chloride or other selected cation salt as a major constitutent. Such a marinade might comprise, for example, in the following preferred order of concentration: water, calcium chloride, dextrose, sodium chloride, onion powder, garlic powder, and papain.

BRIEF DESCRIPTION OF THE FIGURES

All of the figures relate to the Examples set forth below.

Figure 1:
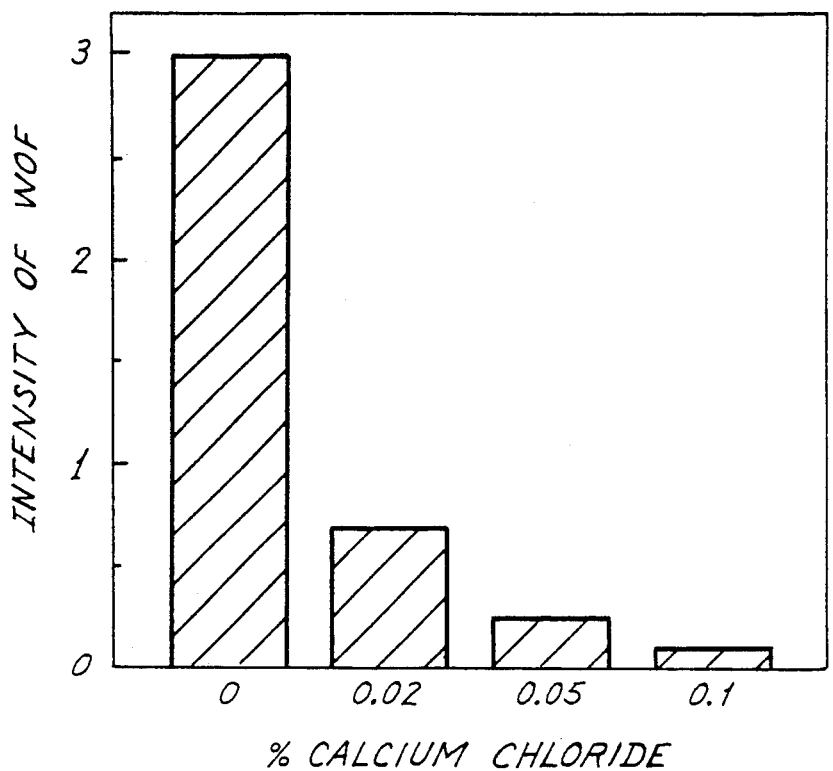
FIG. 1 shows the effect of calcium concentration on WOF development in ground chicken after 3 days of refrigerated storage.

The following examples are designed to illustrate certain aspects of the present invention. These examples are not intended to be comprehensive of all features and all embodiments of the present invention, and should not be construed as limiting the claims presented herein.

EXAMPLE I

Inhibition of WOF by Calcium

1. Preparation of Meat Samples

All meat samples used in these experiments were purchased fresh and additive-free at a supermarket. Turkey, pork and lean beef were bought ground and used as such. Chicken breasts and lamb steaks were manually defatted and deboned and minced before treatment. All samples (100 g) were mixed with 5 g solution (or 5 g water for control) and allowed to imbibe it for 20 minutes at room temperature. The concentration of cation in each solution varied depending upon the particular study. (The percentage data shown in the Figures represents the amount of salt actually taken up by the treated meat sample in terms of salt weight/meat weight as a percentage). The samples were sealed in boil-in-bag pouches and precooked in boiling water for 10 minutes. After cooling to room temperature, the products were placed into $O_2$-permeable plastic bag and stored in the refrigerator at 5° C. After the indicated storage times, samples were analyzed for malondialdehyde (MDA) and WOF.

2. Sensory Analysis 20 g samples of the prepared meats were placed into covered Pyrex glass dishes, reheated in a Litton Generation II microwave oven at a high setting for 20 seconds and evaluated for WOF by a 4-membered trained sensory panel using an arbitrary 9-point scale from 0 to 4.0.

3. Determination of MDA

The extent of lipid peroxidation was monitored by determining MDA using thiobarbituric acid (TBA). MDA and other TBA-reactive low molecular weight aldehydes were extracted from homogenized, acidified meat samples by distillation and measured colorimetrically by the method of Buege and Aust (1978). Malonaldehyde tetraethylacetal was oxidized to MDA and used as a calibrating standard.

The amount of MDA generated from phospholipids in aqueous model systems was measured directly (without distillation) after precipitation of the phospholipids by the sequential addition of bovine serum albumen and trichloroacetic acid (TCA). MDA concentrations were calculated using a molar extinction coefficient of $1.56 \times 10^5$ at 532 nm.

TBA-reactive substances are generally believed to be a reliable chemical index of WOF generation in refrigerated precooked meat, since water-soluble low molecular weight aldehydes, such as MDA, hexanal, heptanal and n-nona-3-6-dienal are formed as degradation products of lipid hydroperoxides and impart the characteristic WOF to precooked poultry. MDA is the most prevalent aldehyde and has been reported as accounting for 93.3% and 98.5% of white and dark chicken TBA-reactive substances, respectively. The results from this Example demonstrated, however, that most of the MDA measured in aged precooked meat did not contribute to the WOF, i.e. some chemicals completely inhibited the development of WOF whereas they lowered the amount of MDA generated only slightly. Therefore, organoleptic evaluation appears to be a more reliable test for the quantitation of WOF in precooked meat samples than the determination of MDA.

4. Peroxidation of Phospholipids

The effect of calcium on the peroxidation of phospholipids was measured in aqueous model systems. Solutions containing 2 mM ascorbic acid, variable concentrations of $CaCl_2$, 10 mM Tris, pH 7.0 and 1 mg/ml of PE from dog brain (the level of iron contamination in the PE was high enough to raise the final concentration to 0.5 micromolar) were incubated at 40° C. for 30 minutes. At the end of the incubation bovine serum albumin was added and MDA was measured spectrophotometrically as described above.

5. Iron Release From Myoglobin

Iron release from myoglobin was measured by incubating samples in 50 mM Tris, pH 7.4 containing 1.6 mM myoglobin, 2 mM ascorbic acid and variable concentrations of sodium nitrate at 37° C. for 5 hours. At the end of the incubation, 150 ppm sodium nitrite was added to inhibit nonspecific iron release during TCA precipitation. Myoglobin was separated from free iron by the addition of 20% TCA and 0.2% thioglycolic acid followed by centrifugation. The supernatant was analyzed for iron by the Ferene S method (Artiss et al, 1981).

6. Effect of Calcium on WOF

FIG. 1 illustrates the pronounced inhibitory effect of $Ca^{2+}$ on the development of WOF in precooked ground chicken breasts upon reheating in the microwave oven after refrigerated storage for 3 days. (The calcium concentration is expressed as percent of total chicken sample). Similar results were obtained with whole pieces of chicken. The effect was independent of the heating and reheating methods (conventional oven vs. microwave oven). Calcium gluconate, calcium acetate and calcium sulfate were equally effective as calcium chloride.

A calcium chloride concentration of 0.1% corresponded to 6.8 mM $Ca^{2+}$; however, the actual concentration in the liquid phase was probably closer to 40 or 50 mM. Furthermore, in a whole piece of chicken there was a concentration gradient of calcium, i.e. the highest level of calcium was concentrated towards the surface of the meat.

Figure 2:
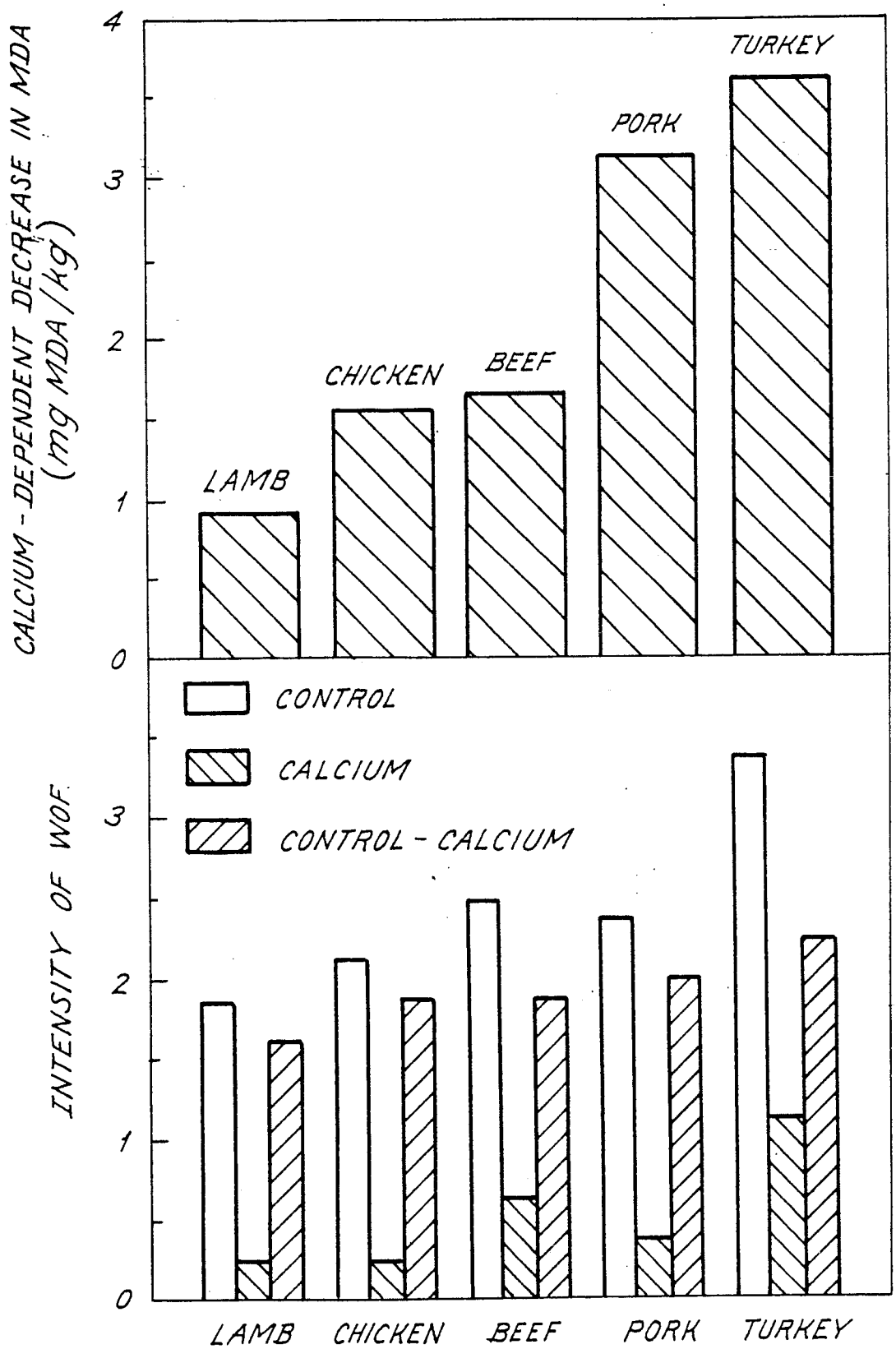
FIG. 2 shows the effect of 0.1% calcium on MDA generation and WOF development in five different types of ground meat after 3 days of refrigerated storage.

Calcium inhibited the development of WOF not only in precooked chicken, but in other myoglobin containing foods, such as fish, beef, lamb, turkey and pork (FIG. 2). It also decreased the generation of MDA in all of these meats, a generally accepted chemical index of WOF. (The decrease in MDA was calculated by subtracting the MDA of the calcium samples from the MDA of the control samples). However, FIG. 2 demonstrates that for the analytical determination of WOF sensory evaluation was much more reliable than the chemical analysis, since only a small portion of the MDA is believed to contribute to WOF.

7. Mechanism of Inhibition

It has been well-documented in the literature that during cooking of meat and during its subsequent refrigerated storage large amounts of iron are liberated from myoglobin. A typical concentration of free iron in cooked meat is 4 ug/g. The mechanism presumably involves oxidation of the heme moiety by lipid peroxides resulting in the release of free iron. In a meat-free model system with 1.6 mM equine skeletal muscle myoglobin and 5 mM ascorbic acid, it was found that after 5 hours of incubation at 37° C., 34 uM $Fe^{3+}$ or 2.1% of the total heme iron had been liberated. Low levels of nitrite (150 ppm) completely suppressed this ascorbate-dependent iron release from both hemoglobin and myoglobin (Table 1). This heme stabilization is expected to retard the onset of WOF, which in fact has been demonstrated in several food systems.

TABLE 1

| NITRITE EFFECT OF IRON RELEASE FROM HEME-PROTEINS | | |
|---|---|---|
| | uM $Fe^{3+}$ Released | |
| Heme-Protein | No Nitrite | 150 ppm Nitrite |
| Hemoglobin | 105 | 0 |
| Myoglobin | 34 | 0 |

Figure 3:
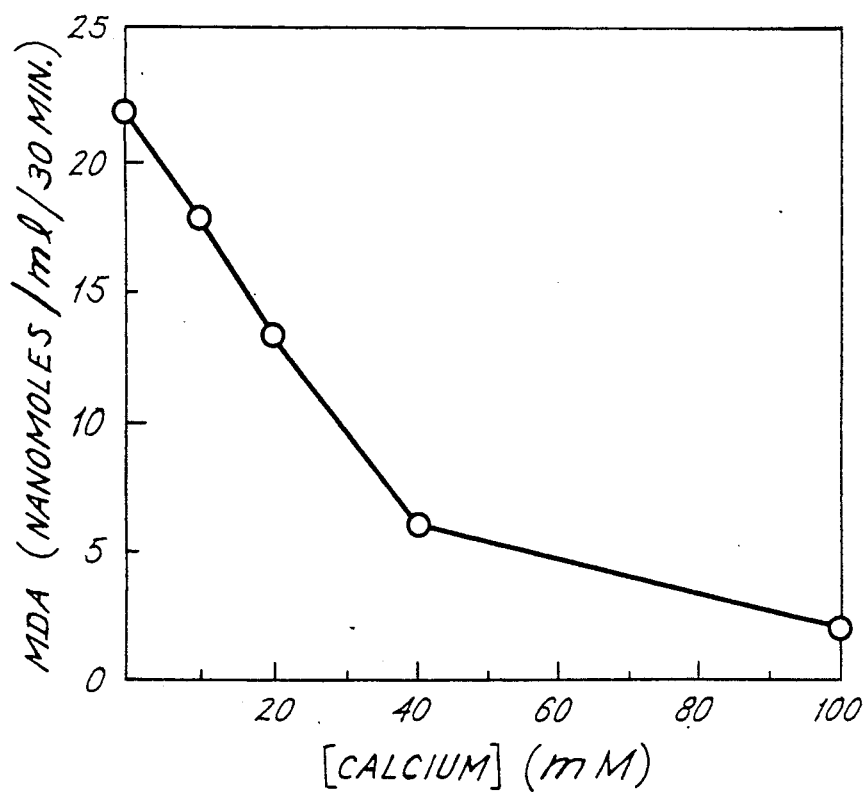
FIG. 3 shows the effect of calcium concentration on the ascorbate-driven peroxidation of PE in 10 mM Tris, pH 7.0 at 37° C.

FIG. 3 shows the observed effect of increasing concentrations of calcium on the peroxidation of PE in a meat-free aqueous model system. Half-maximal inhibition occurred at about 25 mM $Ca^{2+}$, which corresponds to 0.36% $CaCl_2$. At this concentration, $Ca^{2+}$ caused dissociation of 50% of the $Fe^{3+}$-PE complex which decreased the susceptibility of the lipid to peroxidation.

Figure 4:
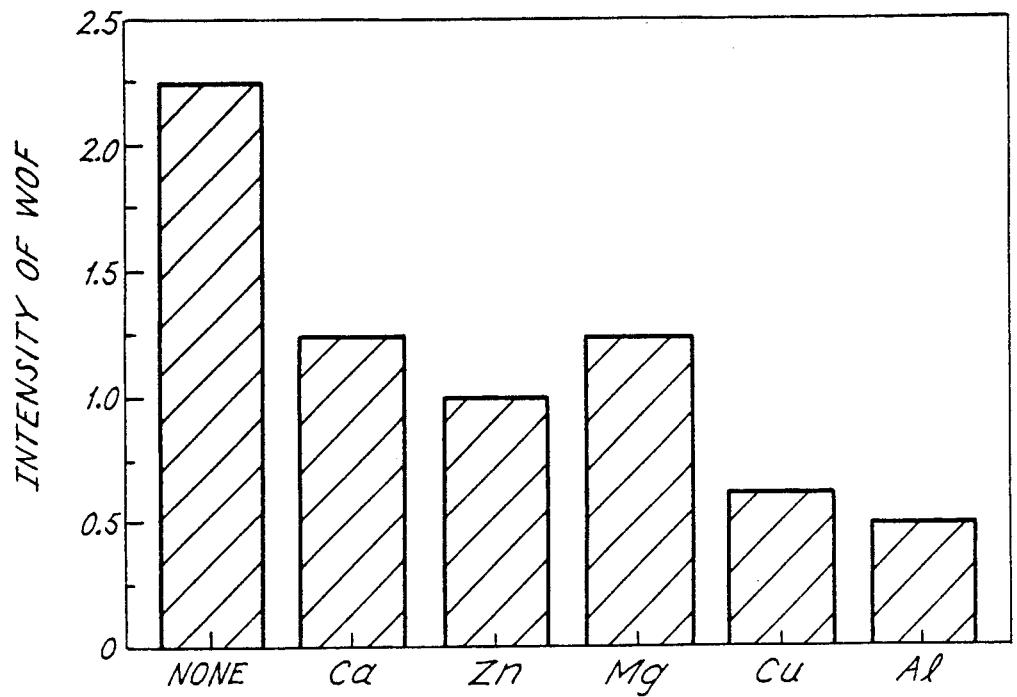
FIG. 4 shows the effect of various polyvalent cations, at a final concentration of 0.025%, on WOF development in ground chicken.

Smaller radius polyvalent cations, such as zinc and copper, are expected to exhibit even higher affinities for phospholipids and thereby displace iron more readily. FIG. 4 shows the observed effect of polyvalent divalent cations on WOF development in ground precooked chicken. The following metal salts were used at a concentration of 0.025% of total chicken sample: $CaCl_2.2H_2O$, $ZnCl_2$, $MgCl_2$, $Al_2(SO_4)_3$ and Cu(II)-gluconate. All divalent cations tested significantly depressed WOF generation in the samples.

Figure 5:
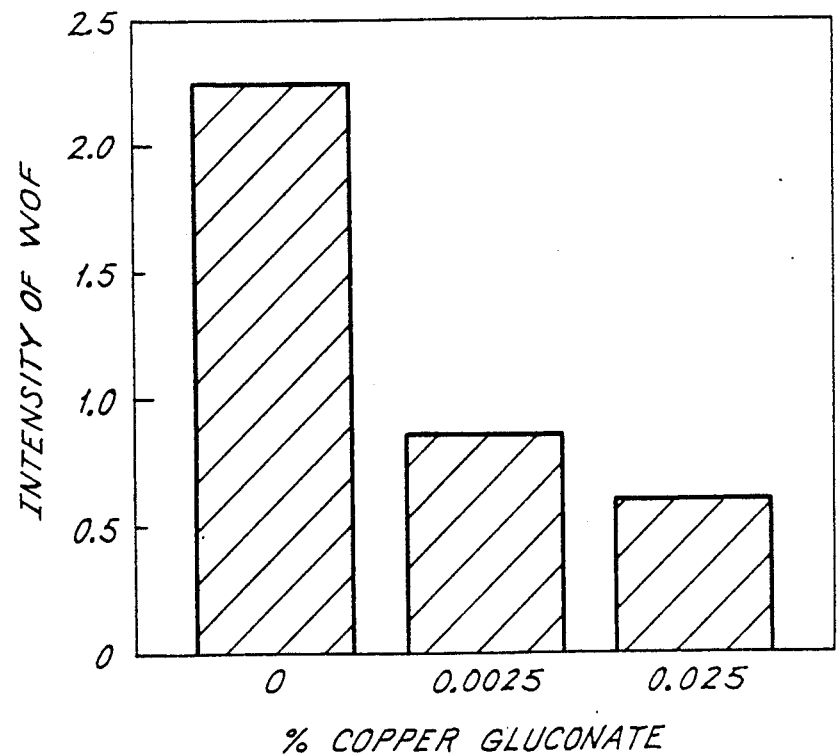
FIG. 5 shows the effect of $Cu^{2+}$ concentration on WOF development in ground chicken after 3 days of refrigerated storage.

Copper ions were particularly effective as shown in FIG. 5. A concentration as low as 0.0025% copper gluconate (=25 ppm copper gluconate=3.5 ppm $Cu^{2+}$=55 um $Cu^{2+}$) still significantly reduced the amount of WOF developed in precooked chicken stored at 5° C. for 3 days.

EXAMPLE II

Preparation of Meat Patties

As much fat as possible is cut away from 1 kg of beef. The rest is twice minced through a grinder, and the ground beef is admixed well with 1 gram of granular calcium chloride. The ground beef/calcium admixture is weighed into approximately 115 gram samples, and each sample is formed into patties, which is then cooked by grilling for approximately 5 to 10 minutes.

The cooked patties are then frozen for two weeks, and subsequently thawed in a refrigerator over a period of three days. The patties are then reheated in a Litton Generation II microwave oven at a high setting for about 1 to 2 minutes, and employed in the preparation of hamburger sandwiches.

EXAMPLE III

Calcium chloride treated meat is prepared and formed into patties as described in Example II above. The meat patties are partially cooked by parbroiling in an oven for 2 minutes at 175° C. The partially cooked patties are then stored in a refrigerator overnight. The next day, the refrigerated patties are then fully cooked by frying for about two to three minutes over medium heat, and used in the preparation of hamburger sandwiches.

EXAMPLE IV

Sausage

Four different stuffings are composed as follows:

| Stuffing No. | Beef % | Fat % | Ratio.Meat:Fat |
|---|---|---|---|
| I | 65.0 | 13.7 | 4.7:1 |
| II | 55.7 | 25.0 | 2.2:1 |
| III | 52.0 | 30.0 | 1.7:1 |
| IV | 50.7 | 35.0 | 1.4:1 |

To these stuffings are added 1.8% of salt and 0.5% of spices. These mixtures are minced in a known way in the cutter. During this mincing an amount of an aqueous 20% calcium chloride solution is gradually added so that finally 3 g of such solution had been worked into 1 kg of sausage mass.

The obtained emulsions are stuffed into sausage rolls, dried for one hour at a temperature of 55° C. and subsequently cooked for 75 minutes at a temperature of 78° C.

The cooked sausage is stored in a refrigerator for four days, and then reheated by boiling for 3 to 5 minutes.

EXAMPLE V

Frozen Cod Pieces 50 pieces of cod weighing about 150 g each are soaked for 15 minutes in about 400 ml of a 2% calcium chloride solution. The soaked pieces are cooked by oven heating at about 200° C. for 15 minutes, and placed into individual microwaveable, compartmentalized plastic trays along with separate portions of precooked rice and peas. The trays are frozen at about −20° C. for 2 months. Individual trays are then allowed to thaw in a refrigerator, and heated in a microwave oven at high setting for 3-5 minutes.

EXAMPLE VI

Example V is repeated, except the frozen trays are stored for 12 months, at −20° C., and immediately reheated by microwaving at a high setting for 8-10 minutes.

EXAMPLE VII

Twenty individual chicken breast strips, weighing about 20 grams each, are soaked in 20 ml of a 2% calcium chloride solution until essentially all of the aqueous solution is taken up by the meat sample. The samples are sealed in a boil-in-bag pouch and precooked in boiling water for 10 minutes. After cooling to room temperature, the products are placed into plastic baggies, frozen for 2 months, then stored in a refrigerator for four days. The chicken pieces are then reheated by microwaving at a high setting for 1-2 minutes and eaten.

EXAMPLE VIII

Seasoning Mix

A seasoning for retarding WOF is prepared as follows:

| Ingredients | % |
|---|---|
| Calcium chloride | 50 |
| Sodium chloride | 20 |
| Dextrose | 10 |
| Paprika | 4 |
| Tumeric | 3 |
| Monosodium glutamate | 3 |
| Onion powder | 3 |
| Corn starch | 2 |
| Garlic powder | 2 |
| Tricalcium phosphate | 1 |
| Meat flavors | 1 |
| Lecithin | 1 |

EXAMPLE IX

Marinade

A marinade for retarding WOF is prepared as follows:

| Ingredients | % |
|---|---|
| Water | 96 |
| Calcium chloride | 1 |
| Dextrose | 1 |
| Sodium chloride | 1 |
| Onion powder | 0.5 |
| Garlic powder | 0.3 |
| Papain | 0.2 |

The meat should be soaked in this marinade of ½ hour before cooking.

This invention has been disclosed in connection with specific embodiments. However, it will be apparent to those skilled in the art that variations from the illustrated embodiments may be undertaken without departing the spirit and scope of the invention.

What is claimed is:

1. A method for retarding the development of warmed-over flavor in meat, comprising adding to the meat an effective amount of a compound that diffuses into the meat and provides a WOF-retarding cation to the meat, without coating said meat with an alginate compound.

2. The method of claim 1, wherein the meat is not cured.

3. The method of claim 1, wherein the WOF-retarding cation comprises $Ca^{2+}$, $Cu^{2+}$, $Zn^{2+}$, $Mg^{2+}$, $Al^{3+}$ or mixtures thereof.

4. The method of claim 1, wherein the WOF-retarding cation comprises $Ca^{2+}$.

5. The method of claim 4, wherein the WOF-retarding cation-providing compound comprises calcium chloride, calcium acetate, calcium gluconate, calcium sulfate or mixtures thereof.

6. The method of claim 1, wherein the amount of the WOF-retarding cation-providing compound added is between about 25 and 5000 parts by weight of the cation per million parts by weight of the meat.

7. The method of claim 1, wherein the amount of the WOF-retarding cation-providing compound added is between about 100 and 2500 parts by weight of the cation per million parts by weight of the meat.

8. The method of claim 1, wherein the amount of the WOF-retarding cation-providing compound added is between about 200 and 1000 parts by weight of the cation per million parts by weight of the meat.

9. The method of claim 1, wherein a sufficient amount of the WOF-retarding cation-providing compound is added such that the average concentration of said compound at the surface of the meat is between about 250 and 5000 ppm.

10. The method of claim 1, wherein the WOF-retarding cation-providing compound is added to the meat by absorbing an aqueous solution of said compound into said meat.

11. The method of claim 1, wherein the WOF-retarding cation-providing compound is added to the meat by soaking said meat in an aqueous solution of said compound.

12. The method of claim 10 or 11, wherein the solution has a concentration of the WOF-retarding cation-providing compound of between about 0.1% and 10% by weight.

13. The method of claim 10 or 11, wherein the solution has a concentration of the WOF-retarding cation-providing compound of between about 0.2% and 5% by weight.

14. The method of claim 10 or 11, wherein the solution has a concentration of the WOF-retarding cation-providing compound of between about 0.4% and 2% by weight.

15. The method of claim 1, wherein the WOF-retarding cation-providing compound is added to the meat by applying said compound to the surface of said meat.

16. The method of claim 1, wherein the WOF-retarding cation-providing compound is added to the meat by spraying a solution of said compound onto the surface of said meat.

17. The method of claim 1, wherein the WOF-retarding cation-providing compound is added to the meat by coating said compound onto the surface of said meat.

18. The method of claim 1, wherein the WOF-retarding cation-providing compound is added to the meat by sprinkling solid particles of said compound onto said meat.

19. The method of claim 1, wherein the meat is ground and the WOF-retarding cation-providing compound is mixed with the ground meat.

20. The method of claim 1, further comprising the steps of:
   cooking the meat;
   cooling the cooked meat to a temperature below about 10° C.; and
   storing said meat for at least about 20 minutes at a temperature below about 10° C.

21. The method of claim 20, wherein the WOF-retarding cation-providing compound is added to the meat before the cooking step.

22. The method of claim 20, wherein the WOF-retarding cation-providing compound is added to the meat during the cooking step.

23. The method of claim 1, wherein the WOF-retarding cation comprises $Cu^{2+}$.

24. A seasoning, free of an alginate compound, for adding to meat which is to be cooked and stored under refrigeration, comprising a WOF-retarding cation-providing compound that can diffuse into said meat in an amount effective to retard the development of warmed-over flavor in the meat.

25. The seasoning of claim 24, wherein the WOF-retarding cation comprises $Ca^{2+}$, $Cu^{2+}$, $Zn^{2+}$, $Mg^{2+}$, $Al^{3+}$ or mixtures thereof.

26. The seasoning of claim 24, wherein the WOF-retarding cation comprises $Ca^{2+}$.

27. The seasoning of claim 26, wherein the WOF-retarding cation-providing compound comprises calcium chloride, calcium acetate, calcium gluconate, calcium sulfate or mixtures thereof.

28. The seasoning of claim 24, wherein the WOF-retarding cation comprises $Cu^{2+}$.

29. Meat, free of an alginate coating, which has absorbed therein a WOF-retarding cation-providing compound in an amount effective to retard the development of warmed-over flavor in the meat.

30. The meat of claim 29 which is not cured.

31. The meat of claim 29, wherein the WOF-retarding cation comprises $Ca^{2+}$, $Cu^{2+}$, $Zn^{2+}$, $Mg^{2+}$, or mixtures thereof.

32. The meat of claim 29, wherein the WOF-retarding cation comprises $Ca^{++}$.

33. The meat of claim 32, wherein the WOF-retarding cation-providing compound comprises calcium chloride, calcium acetate, calcium gluconate, calcium sulfate or mixtures thereof.

34. The meat of claim 29, wherein the amount of the WOF-retarding cation-providing compound is between about 25 and 5000 parts by weight of the cation per million parts by weight of the meat.

35. The meat of claim 29, wherein the amount of the WOF-retarding cation-providing compound is between about 100 and 2500 parts by weight per million parts by weight of the meat.

36. The meat of claim 29, wherein the amount of the WOF-retarding cation-providing compound is between about 200 and 1000 parts by weight per million parts by weight of the meat.

37. The meat of claim 29, wherein the WOF-retarding cation-providing compound is concentrated at or near the surface of the meat.

38. The meat of claim 29 or 37, wherein the average concentration of the WOF-retarding cation-providing compound at the surface of the meat is between about 250 and 25000 ppm.

39. The meat of claim 29, wherein the WOF-retarding cation comprises $Cu^{2+}$.

40. A method for inhibiting iron-catalyzed oxidation of phospholipids in a material composed of a heme-containing protein, comprising adding to said material an effective amount of a compound, other than an alginate compound, that diffuses into said material and provides a polyvalent cation other than an iron ion in solution.

41. A method for inhibiting the development of warmed-over flavor in meat, comprising adding to the meat an amount of a WOF-retarding cation-providing compound which diffuses into the meat and is effective to inhibit iron-catalyzed oxidation of phospholipids in the meat, without coating said meat with an alginate compound.

* * * * *